(No Model.)
J. S. WECKMAN.
FIELD ROLLER.
No. 387,468. Patented Aug. 7, 1888.
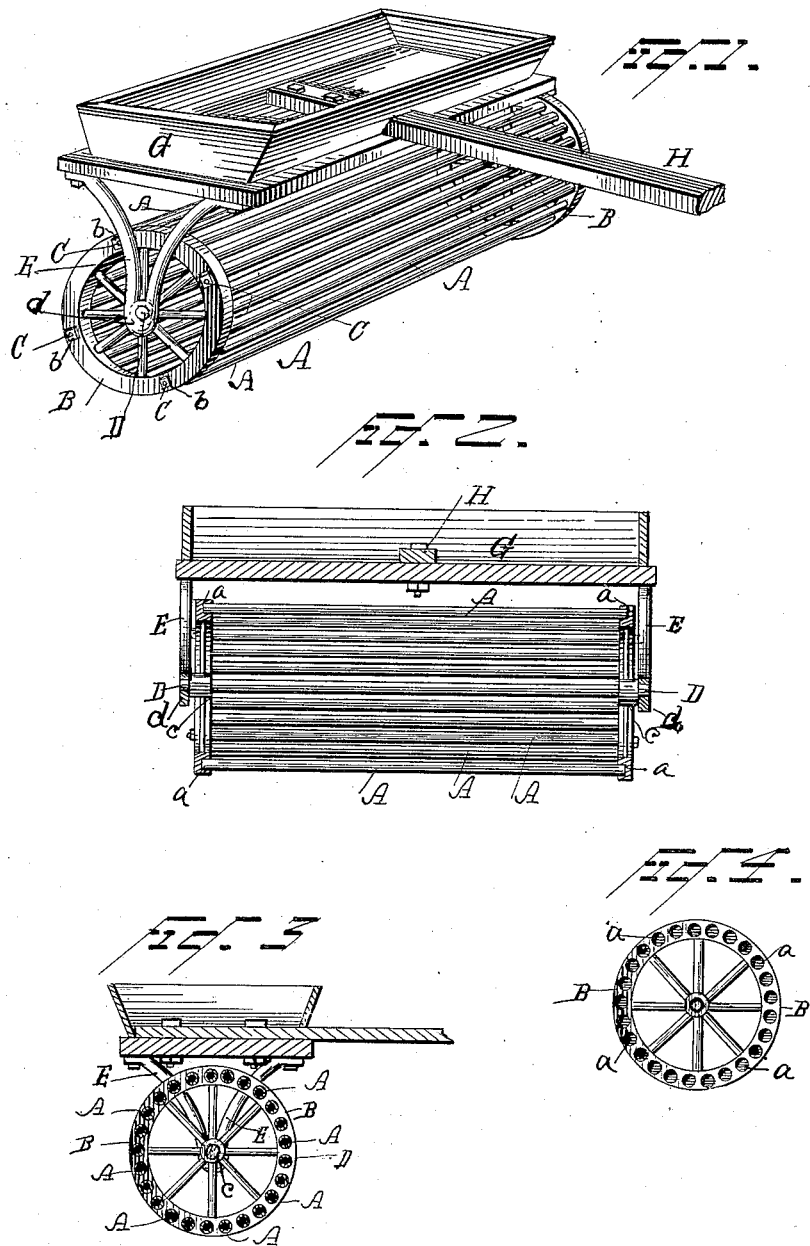
WITNESSES
Norris A. Clark
A. W. Bright
INVENTOR
John S. Weckman,
By his Atty.,
J. S. Brown.

UNITED STATES PATENT OFFICE.

JOHN S. WECKMAN, OF CANTON, OHIO.

FIELD-ROLLER.

SPECIFICATION forming part of Letters Patent No. 387,468, dated August 7, 1888.

Application filed July 2, 1887. Serial No. 243,248. (No model.)

*To all whom it may concern:*

Be it known that I, JOHN S. WECKMAN, of Canton, in the county of Stark and State of Ohio, have invented an Improved Field-Roller; and I do hereby declare that the following is a full and exact description of the same, reference being had to the accompanying drawings, making part of this specification.

My invention consists in a field-roller or section of a roller formed of a series of pipes or tubes—such as made from ordinary gas-pipe—arranged concentrically in the general form of a cylinder, the pipes being secured to heads adapted to receive the ends of the pipe abutting against them and held to the pipes by rods passed lengthwise through several of the pipes and through the heads and secured by nuts on the rods outside of the heads, or equivalent means, substantially as and for the purpose herein specified.

In the accompanying drawings, Figure 1 represents a view, in perspective, of a field-roller constructed according to my invention; Fig. 2, a central longitudinal section of the same; Fig. 3, a transverse section of the same; Fig. 4, a view of the inner side of one of the heads of the roller.

In the drawings, A A represent a series of pipes—such as pieces of gas-pipe—of uniform length; and B B two heads, of cast-iron or other suitable material, employed to connect and hold the pipes in position. The pipes A A are simple pieces cut off at right angles to their axes. The heads B B preferably have shallow mortises or depressions $a\ a$ to receive the ends of the pipes and keep them securely in exact position. To secure the pipes to the heads, a number of rods, C C—say, four or six—ordinarily of iron, are passed longitudinally through a corresponding number of the pipes and through holes in the heads, and ordinarily secured by nuts $b\ b$, screwed upon the ends of the rods, or one end of each rod has a head or enlargement at one end, with a nut screwed upon the other end.

The roller is mounted in any usual or desired manner. Thus I show a shaft, D, passed through bearings $c\ c$ in the centers of the heads B B and bearings $d\ d$, in brackets E E, which support a box, G, for weighting the roller, the whole being drawn by a tongue, H, attached to the middle of the weighting-box.

The pipes A A are severally at some distance apart, as indicated in the drawings, leaving open spaces between them. The heads also may have openings in them, as shown, or otherwise. It is found that these round gas-pipes leave the ground in a light and excellent condition, with fine alternate ridges and furrows well adapted to absorb water and making the surface of the ground lighter than a solid roller leaves. Moreover, the roller does not clog when the ground is wet, since the clods are pressed through between the pipes into the inside of the roller and are shaken to pieces as the roller rotates, and again are sifted out through the same spaces, there being no projections nor obstructions in the roller to prevent this action.

By my improved means of construction the roller is made very quickly and cheaply, with the least labor and material, and is very strong and durable.

I claim as my invention—

A field-roller constructed of a series of pipes arranged in the general form of a cylinder, with spaces between one another, heads provided with depressions to receive the ends of the pipes, and rods passed longitudinally through some of the pipes, through the heads, and secured outside of the heads, substantially as and for the purpose herein specified.

In witness whereof I have hereunto signed my name in the presence of two subscribing witnesses.

JOHN S. WECKMAN.

Witnesses:
JOHN C. F. ROYER,
J. H. HAMAKER.